Patented July 4, 1950

2,513,549

UNITED STATES PATENT OFFICE 2,513,549

STABILIZED SULFAMIC ACID PRODUCT AND METHOD OF PREPARING THE SAME

John Randolph Clark, Nutley, and John David Malkemus, Allendale, N. J., assignors to Colgate-Palmolive-Peet Company, Jersey City, N. J., a corporation of Delaware No Drawing. Application July 18, 1946,
Serial No. 684,546

14 Claims. (Cl. 260—459)

This invention relates to a method for stabilizing the reaction products obtained by sulphating organic hydroxy compounds such as various mono- or polyhydric alcohols, partial esters, ethers or other derivatives thereof in which there remain at least one free hydroxy group, etc., by the use of sulphamic acid as the sulphating agent. The invention relates further to compositions of matter comprising reaction products of the foregoing nature which have been treated in such manner as to effect stabilization thereof, such stabilized compositions of matter being of particular importance for uses as detergents and as wetting, dispersing, emulsifying and foaming agents.

In a co-pending application, Serial No. 670,856, filed May 18, 1946 by Malkemus, Potter and Ross, now Patent 2,452,943 issued November 2, 1948, there are described methods for sulphating monohydric and polyhydric alcohols and derivatives thereof having at least one free hydroxy group, by reaction with sulphamic acid according to which there is employed a catalyst which consists of or which contains an amide or amide-like substance such as acetamide, urea, thiourea, dicyandiamide, etc. The alcohols and alcohol derivatives used in carrying out the reaction may be any primary or secondary alcohol, such as aliphatic, alicyclic and aromatic monohydric and dihydric alcohols, glycols, glycerols, diglycerols and polyglycerols, and polyhydric alcohols in general, any alcohol or alcohol derivative having at least one functional alcoholic-OH group remaining in the molecule being suitable for use. Fatty acid hydroxy esters, fatty acid hydroxy amides, and simple fatty acid esters of polyhydric alcohols may also be used so long as at least one functional alcoholic-OH group is present in the molecule. Typical of such compounds are: lauryl alcohol, methyl undecyl carbinol, cyclohexanol, methyl ricinoleate, propylene glycol monoesters of capric, lauric, myristic, coconut and stearic acids, ethylene glycol monoesters of lauric, coconut and stearic acids, diethylene glycol monostearate, and glycerine derivatives such as monolaurin, monoolein, dicaprylin and dilaurin. These and other alcohols and alcohol derivatives are herein referred to by the generic terms "alcohols" and "alcohol derivatives."

According to the procedure disclosed in the aforesaid co-pending application, the reaction preferably is effected in the presence of a slight excess of sulphamic acid to insure complete sulphation of the hydroxy compound, and any excess sulphamic acid that might remain in the reaction product is neutralized with an alkaline material such as ammonia gas. While the process described in the aforesaid co-pending application is in general admirably suited to the production of sulphation products of the character herein contemplated, it has been found that under certain circumstances the sulphation reaction products obtained in the manner just mentioned, when dissolved in water or water-alcohol mixtures, gradually become more and more acidic due to the decomposition of certain constituents thereof, with a consequent undesirable decrease in the stability of the aqueous solutions prepared from such sulphation reaction products.

In accordance with the present invention, the foregoing and other disadvantages and difficulties encountered in connection with the preparation of sulphation products of organic hydroxy compounds by the action of sulphamic acid, whether these compounds are prepared as set fourth in the aforesaid co-pending application of Malkemus et al. or in accordance with any other desired procedure, are overcome by simple and economical means, whereby there are obtained sulphation products having not only excellent wetting, deterging, emulsifying and foaming properties, but also excellent stability characteristics. These last-mentioned characteristics are extremely important from the point of view of satisfactory commercial exploitation of sulphation reaction products of the type here under consideration.

Accordingly, one of the principal objects of the present invention is to provide new and improved methods for effecting the stabilization of sulphation reaction products obtained by the action of sulphamic acid upon organic hydroxy compounds, whether prepared by the procedure described and claimed in the aforesaid co-pending application or otherwise.

Another object of the invention is to provide sulphation reaction products of the class obtained by the sulphamic acid sulphation of organic hydroxy compounds, which sulphation reaction products have been suitably treated in such manner as greatly to increase the stability thereof.

A still further object of the invention is to provide an improved class of sulphation reaction products derived from the sulphamic acid sulphation of organic hydroxy compounds, which sulphation reaction products have been suitably combined with one or more reagents capable of substantially increasing the resistance to hydrolysis in aqueous solution of the said sulphation reaction products.

The manner in which these and other objects and features of the invention are attained will appear more fully from the following description thereof in which reference is made to typical and preferred procedures and examples in order to indicate more fully the nature of the invention but without intending in any way to limit the scope of the invention thereby.

It has been discovered that the sulphation reaction products obtained by reacting sulphamic acid and organic hydroxy compounds such as mono- and polyhydric alcohols and derivatives of such polyhydric alcohols as still contain one free hydroxyl group, and with or without the presence of catalysts such as those of the amide type, as disclosed and claimed in the co-pending application of Malkemus et al. referred to above, tend when dissolved in water or water-alcohol mixtures to become gradually acidic and to decompose due to hydrolysis of the sulphate group and, when partial esters of polyhydric compounds are employed as starting materials, hydrolysis of the carboxylic ester group or groups as well.

It will be recalled that the general reaction involved in the sulphation of the alcohols or alcohol derivatives still containing at least one free hydroxy group of the kind here under consideration proceeds as follows:

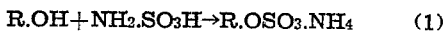

$$R.OH + NH_2.SO_3H \rightarrow R.OSO_3.NH_4 \quad (1)$$

Furthermore, when the starting material consists of or contains a partial ester of a polyhydric compound, as for example a monoglyceride, then the sulphated reaction products will also contain at least one carboxylic ester group.

The hydrolysis in water of the sulphate group and, when there is present one or more carboxylic ester groups, the hydrolysis of such groups may be regarded conveniently as proceeding as follows:

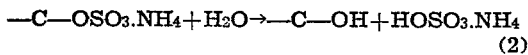

$$—C—OSO_3.NH_4 + H_2O \rightarrow —C—OH + HOSO_3.NH_4 \quad (2)$$

and

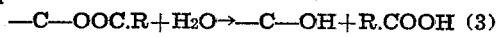

$$—C—OOC.R + H_2O \rightarrow —C—OH + R.COOH \quad (3)$$

respectively.

It has been discovered that the presence of sulphamate ion in aqueous solution on the acid side (i. e., pH 7.0 or less, for example, 6.0) causes such solutions progressively to become more acidic and thus further to accelerate the hydrolysis of sulphate and, when present, ester groups. Thus, the pH of a 2% ammonium sulphamate solution dropped from 6.0 to 2.7 after standing overnight at 130° F. When free sulphamic acid itself is present, this becomes hydrolyzed to $NH_4.SO_4.H$ at a relatively rapid rate, thus increasing the acidity of the aqueous solutions of sulphation reaction product, and "pyramiding" the deleterious effect of hydrolysis on the principal sulphation reaction product. This illustrates the importance of combating the increase in acidity to which the aqueous solutions of these sulphation reaction products are normally subject, since under such conditions any sulphamate ion remaining therein contributes in a very undesirable manner to the instability and consequent destruction of the desired sulphation reaction product which it is the object to produce in stable form.

In accordance with the present invention, it has been discovered that the crude sulphation reaction products derived from the sulphamic acid sulphation of alcohols, or of alcohol derivatives still containing at least one free hydroxyl group, and which crude products contain sulphate groups and/or compounds having carboxylic ester groups, and possibly other easily hydrolized compounds, may be subjected to a stabilizing treatment which includes the feature of adding to water or water-alcohol solutions made up from the sulphation reaction products, buffer materials which will tend to maintain the pH of the composition at the desired value, for example about 6.0, or in other words just slightly on the acid side.

In general suitable buffer materials or agents for use in accordance with the present invention including salts of weak acids, either organic or inorganic, water-soluble alkali metal, ammonium and alkylol amine (e. g., mono-, di- and triethanolamines or various mixtures thereof) salts of such acids being particularly well adapted for use for present purposes.

In view of the fact that the principal sulphation reaction product is itself an ammonium salt (see Equation 1 above) it will be found very convenient and quite satisfactory in many cases simply to add to the water or water-alcohol solution of the sulphation reaction product to be stabilized a relatively small quantity of the corresponding weak acid, and thereafter adjusting the pH of the solution to the desired value for its intended use, such preferred pH values in general lying within the range of about 5.5 to 6.5. Since the solution already contains ammonium ions, this procedure is tantamount to adding to the solution the desired ammonium salt of the selected weak acid per se.

As the weak acids whose salts are adapted for use there may be mentioned inorganic acids such as the phosphoric acids (e. g., orthophosphoric acid and pyrophosphoric acid) and relatively low molecular weight organic acids such as acetic, lactic, malonic, maleic, tartaric, succinic, and citric acids. The last five acids just mentioned fall in a class of organic acids whose salts are particularly desirable for use herein, namely, relatively low molecular weight polycarboxylic acids having at least three carbon atoms. Of the relatively low molecular weight monocarboxylic acids whose salts are suitable, it is generally preferred not to go above four carbon atoms due to the possibility that higher members of the series may impart objectionable odors and/or tastes to the sulphation reaction products being treated due to the presence of the free acid in equilibrium in the system; consequently monocarboxylic acids of from two to four carbon atoms represent the preferred members of this group of reagents.

It will be noted from the compounds enumerated that the presence of simple substituents in the acid portion of the molecule is not excluded; in fact, certain hydroxy-acids including the three specifically mentioned above are eminently suited for use in connection with the present invention.

In order to indicate even more fully the nature of the present invention, the following examples of typical procedure are set forth, it being understood that these examples are presented as illustrative only and that they are not intended to limit the scope of the invention. The parts given are parts by weight unless otherwise indicated.

For the sake of completeness, there are first set forth hereinafter three examples (Nos. I, II and VII) taken from the aforesaid co-pending application of Malkemus et al. in order to indicate preferred procedure for obtaining in the first instance the sulphamic acid sulphation reaction products to the treatment of which the present invention is particularly applicable.

*Example A*

105 parts of sulphamic acid are suspended in 267 parts of propylene glycol monoester of coconut fatty acids, and 10 parts of dicyandiamide are added. The mixture is heated in an atmosphere of carbon dioxide to a temperature of from about 115° to 125° C. with constant stirring. The reaction product which soon begins to form remains suspended in the liquid and, as the reaction continues, a pasty, semi-solid mass is finally produced. The reaction is substantially completed in about eighty minutes, as indicated by titration of a sample of the product for free acid. The excess of sulphamic acid present in the mass is then neutralized by passing ammonia gas into the material, and there is obtained as a final product a cream-colored paste which, if desired, may be dissolved in water to form a clear solution having a pH of 5.7, which foams well on agitation.

*Example B*

100 parts of sulphamic acid are agitated with 250 parts of coconut acid monoester of propylene glycol and 8 parts of acetamide at about 120° C. The reaction is completed in about thirty minutes, whereupon after the ammonia neutralization step a product is obtained which is quite soluble in water and which in aqueous solution foams very well when agitated.

*Example C*

A mixture of 200 parts methyl undecyl carbinol, 110 parts sulphamic acid and 25 parts urea was stirred at 110° C. for thirty minutes. The light tan mass obtained as a product after the ammonia neutralization step may be dissolved in water to give a clear solution which foams well on shaking.

*Example I*

100 parts of the sulphation reaction product obtained according to the procedure in Example A above are dissolved in 500 parts of water. To this aqueous solution 3 parts of disodium dihydrogen pyrophosphate are added as a buffer agent and the pH adjusted to 6.0 with $NH_4OH$. After storing the solution at 130° F. for a period of 2 months the pH of the solution shows a value of about 5.8, and at the end of this time the buffered solution of sulphation reaction product is found to retain substantially undiminished its original foaming and surface active properties.

100 parts of the same sulphation reaction product are dissolved in 500 parts of water and the resulting solution is stored at 130° F. for a similar period, thus duplicating the treatment indicated in the preceding paragraph except for the omission of buffer agent. At the end of this period the solution shows a pH of about 2.0, and shows evidence of drastic decomposition, retaining little of its original foaming properties. This product after storage in the manner indicated is in fact worthless as a foaming and surface active agent.

*Example II*

100 parts of the sulphation reaction product obtained according to the procedure in Example A above are dissolved in 500 parts of water. To this aqueous solution 3 parts of citric acid are added as a buffer agent and the pH adjusted to 6.2 with $NH_4OH$. After storing the solution at 130° F. for a period of 2 months the pH of the solution shows a value of 6.1, and at the end of this time the buffered solution of sulphation reaction product is found to retain substantially undiminished its original foaming and surface active properties.

*Example III*

5 parts of sodium maleate,

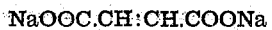

are added as buffer agent to a solution obtained by admixing 100 parts of sulphation reaction product prepared according to the procedure of Example B above with a mixture consisting of 400 parts of water and 100 parts of ethyl alcohol. The solution is then adjusted to a pH of 6.0 by the addition of $NH_4OH$. The solution is then stored at a temperature of 130° F. At the end of 30 days' storage under these conditions the solution still shows a pH of 6.0 and retains the excellent foaming and detersive properties of the original sulphation reaction product as initially produced.

*Example IV*

100 parts of the sulphation reaction product as obtained by the procedure of Example C above are dissolved in 500 parts of water. To the resulting aqueous solution 10 parts of sodium dihydrogen orthophosphate are added and the solution adjusted to a pH of 6.0. The solution is then stored at a temperature of 130° F. for a period of 21 days. At the end of the 21 days' storage period the buffered solution retains its original pH value of 6.0 and displays substantially the same degree of surface activity as respects its foaming and detersive properties as did the original aqueous solution of freshly prepared sulphation reaction product.

A quantity of aqueous solution of the same sulphation reaction product is made up in exactly the same manner but without the addition of sodium dihydrogen orthophosphate, and stored under like storage conditions. However, this solution decomposes after standing overnight, with resulting loss of the major portion of its surface active properties.

*Example V*

100 parts of the sulphation reaction product obtained according to the procedure of Example A above are dissolved in a mixture of 400 parts of water and 100 parts of ethyl alcohol. To this water-alcohol solution there are added 10 parts of dipotassium tartrate as a buffer agent, and the pH adjusted to 6.5 with $NH_4OH$. The buffered solution is stored at 130° F. for a period of 6 weeks, at the end of which time its pH is found to have dropped to only 6.3. After this storage period the buffered solution is found to be substantially as surface active as when it was first placed in storage.

A solution of sulphation reaction product otherwise identical in composition and storage treatment, except that no buffer agent is added thereto, is found at the end of the storage period to have decomposed badly and to have retained little of its original surface active properties.

*Example VI*

100 parts of the sulphation reaction product obtained according to the Example B procedure are dissolved in 400 parts of water, after which 8 parts of succinic acid are added as a buffer agent and the resulting solution is adjusted to a pH of 6.0 with NH4OH. Upon storing the buffered solution at 130° F., it is found that the pH of the solution drops only slightly, to 5.8, after 3 months, and that the buffered solution retains substantially undiminished its original foaming properties.

*Example VII*

To 100 parts of the sulphation reaction product obtained by the Example B procedure, dissolved in a mixture of 400 parts of water and 100 parts of ethyl alcohol, there are added 12 parts of sodium malonate as buffer agent, and the solution is adjusted to a pH of 6.2 with NH4OH. Upon storing one month at 130° F., the solution thus treated shows a pH of 6.1 and exhibits foaming and detersive properties that compare very favorably with the freshly prepared solution.

*Example VIII*

In a mixture of 400 parts of water and 100 parts of ethyl alcohol there are dissolved 100 parts of the sulphation reaction product obtained by the procedure of Example C above. This solution is then treated with 8 parts of lactic acid and the pH adjusted to 6.0 with NH4OH. After storage for one month at 130° F., the buffered solution shows the same pH and substantially the same foaming and detersive properties as when freshly prepared.

*Example IX*

100 parts of the sulphation reaction product obtained by the procedure of Example A above are dissolved in 500 parts of water, and to the resulting solution there are added 4 parts of sodium acetate, after which the pH is adjusted to 6.0 with NH4OH. The buffered solution is then stored at 130° F. for a period of 3 weeks at the end of which time its pH is found to be 5.7, and its surface active properties are found to compare favorably with the surface active properties that it possessed when it was freshly prepared.

It will be appreciated, of course, that storage at 130° F. represents comparatively drastic test conditions for solutions of surface active agents of the character here involved, so that a product which in aqueous solution is able successfully to withstand storage for a substantial period of time at this elevated temperature without any substantial change in pH value, without any substantial decomposition thereof and without any substantial reduction in surface active properties may be regarded as a fairly stable product.

In general, the stabilizing treatment is carried out by admixing the chosen buffer material or agent with an aqueous solution of a crude sulphation reaction product at ordinary room temperature. However, somewhat lower or higher temperatures may be employed if desired.

The quantity of buffer material or agent to be employed may vary over wide ranges, considerable latitude in this respect being permissible. The quantity to be employed in any given case depends partly upon the concentration in solution of the sulphation reaction product undergoing treatment as well as upon the quantity of solution being treated. Quantities of buffer material or agent within the range of approximately ½ to 10% by weight, based upon the weight of the solution undergoing treatment, and assuming that the solution contains about 10 to 50% by weight of crude sulphation reaction product, represents preferred procedure. Higher or lower concentrations of buffer materials may be employed depending upon the considerations set forth herein, as will be apparent to the skilled chemist.

If desired it may be preferred to determine the optimum quantity of buffer material or agent that represents preferred procedure in any given instance, by making one or a few trial runs upon small aliquots of the main batch of material to be stabilized and, from the results thereof, determining in advance whether to increase or decrease the proportion of stabilizing agent to be employed in the treatment proper.

While the foregoing examples have dealt more specifically with the application of the present invention wherein the buffer materials or agents of a kind here under consideration are admixed with the sulphation reaction product for stabilizing purposes after the latter has been placed in aqueous solution, in which form such materials are most generally used, it nevertheless will be understood that the invention contemplates as coming fully within the scope thereof the feature of preparing the crude sulphation reaction products in anhydrous form as indicated above in Examples A, B and C, and then while still in anhydrous form admixing them with a predetermined relatively small quantity of normally solid buffer material of the kinds referred to above, and marketing the resulting composition in this form. Under these circumstances it will be appreciated that the crude sulphation reaction product in the form in which it is marketed will have premixed therewith a material capable of engendering the desired buffer action when the composition is made up in aqueous solution for ultimate use.

Under certain circumstances it may in fact be preferred to practice the invention in the manner just mentioned, in view of the fact that a considerable length of time may elapse between the original preparation of the sulphation reaction product and its ultimate use. However, perhaps the greatest advantage of proceeding in this fashion is that it enables the manufacturer to prepare a composition of the general character of that herein contemplated which, when dissolved in water or a water-containing solution for use by the ultimate consumer, will produce a solution that will be at the desired pH, and moreover one that will tend to remain at this pH, thus combating the tendency of the sulphation reaction product to hydrolize with passage of time and hence to lose its efficacy as regards its surface active properties.

An example of procedure to illustrate this feature of the invention is as follows:

*Example X*

100 parts of the sulphation reaction product obtained according to a procedure of Example A above, and while still in an anhydrous condition following the step of neutralizing with ammonia gas, are admixed with 5 parts of sodium citrate in finely divided form, and the latter is thoroughly dispersed throughout the former by suitable agitation.

The resulting pasty composition is divided into two equal portions. One of these portions is added to a mixture of 200 parts of water and 50 parts of ethyl alcohol, and the pH of the resulting solution is measured and found to have a value of 5.8. This water-alcohol solution is found to have excellent foaming and detersive properties. The solution made up in this manner is stored at a temperature of 130° F. for a period of 25 days, at the end of which time its pH is found to have the value of 5.6, the solution retaining substantially undiminished its original foaming and detersive properties.

The second portion of the anhydrous composition comprising sulphation reaction product and sodium citrate is stored under anhydrous conditions at 130° F. for 25 days. At the end of this period it is dissolved in a mixture of 200 parts of water and 50 parts of ethyl alcohol, the pH of the resulting solution being 5.8. This solution has excellent foaming and detersive properties. After ascertaining its pH and examining its foaming and detersive characteristics, this solution is stored for a period of a month at 130° F. At the end of this time its pH is 5.6 and its foaming and detersive properties are fully comparable with those of the aqueous solution made up from the freshly prepared sulphation reaction product.

The stabilized sulphation products produced in accordance with the present invention possess extremely useful surface active properties and may be employed as detergents, wetting agents, foaming agents, emulsifiers, or as dispersing agents. These products may be used by themselves or with other detergents, fillers, and the like in the form of cakes, bars, beads, flakes, chips, pastes, or liquids. They are useful as shampoos, dental detergents and for washing or cleaning purposes. They may also be used in dyeing processes, as dispersing agents in oil and water paints, fungicides, and similar compositions. They are excellent emulsifiers for use in cosmetics, waxes, polishes and in ore flotation processes, and may be used as demulsifiers for water-in-oil petroleum emulsions. They are also useful in lubricants and may be employed as anti-splattering agents for cooking fats. Many other applications will occur to those skilled in the art.

In general, the stabilized products are light-colored, pasty compositions which are largely soluble in water. They are non-toxic and non-irritating to the skin, and do not have a pronounced odor.

The terms "weak inorganic acids" and "weak organic acids" as used in the specification and appended claims refer to acids which dissociate into ions in aqueous solutions to a lesser extent than such acids as hydrochloric or sulfuric.

While various specific examples of preferred compositions and methods embodying the present invention have been described above, it will be apparent that many changes and modifications may be made in the methods of procedure, and that a wide variety of specific reagents may be employed in carrying out the procedure. It should therefore be understood that the examples cited and the particular proportions and methods of procedure set forth above are intended to be illustrative only, and are not intended to limit the scope of the invention.

What is claimed is:

1. A method for stabilizing a sulphated product formed by reacting sulphamic acid with an organic compound consisting of carbon, hydrogen and oxygen atoms and containing at least one functional group selected from the class consisting of alcohols, ethers and carboxylic acid esters, said organic compound having at least one functional alcoholic-OH group remaining in the molecule, there being present in the said organic compound no oxygen other than in the form of ethereal oxygen, carboxylic acid ester oxygen or alcoholic oxygen, which comprises admixing said sulphated product with a buffer agent selected from the class consisting of weak inorganic and organic acids and water-soluble salts thereof selected from the group consisting of alkali metal, ammonium and amine salts.

2. A method for stabilizing a sulphated product formed by reacting sulphamic acid with an organic compound consisting of carbon, hydrogen and oxygen atoms and containing at least one functional group selected from the class consisting of alcohols, ethers and carboxylic acid esters, said organic compound having at least one functional alcoholic-OH group remaining in the molecule, there being present in the said organic compound no oxygen other than in the form of ethereal oxygen, carboxylic acid ester oxygen or alcoholic oxygen, which comprises admixing said sulphated product with a buffer agent selected from the class consisting of weak inorganic acids and water-soluble salts thereof selected from the group consisting of alkali metal, ammonium and amine salts.

3. A method for stabilizing a sulphated product formed by reacting sulphamic acid with an organic compound consisting of carbon, hydrogen and oxygen atoms and containing at least one functional group selected from the class consisting of alcohols, ethers and carboxylic acid esters, said organic compound having at least one functional alcoholic-OH group remaining in the molecule, there being present in the said organic compound no oxygen other than in the form of ethereal oxygen, carboxylic acid ester oxygen or alcoholic oxygen, which comprises admixing said sulphated product with a buffer agent selected from the class consisting of weak organic acids and water-soluble salts thereof selected from the group consisting of alkali metal, ammonium and amine salts.

4. A method for stabilizing a sulphated product formed by reacting sulphamic acid with an organic compound consisting of carbon, hydrogen and oxygen atoms and containing at least one functional group selected from the class consisting of alcohols, ethers and carboxylic acid esters, said organic compound having at least one functional alcoholic-OH group remaining in the molecule, there being present in the said organic compound no oxygen other than in the form of ethereal oxygen, carboxylic acid ester oxygen or alcoholic oxygen, which comprises admixing said sulphated product with a buffer agent selected from the class consisting of organic polycarboxylic acids having at least 3 carbon atoms and water-soluble salts of such acids.

5. A method for stabilizing a sulphated product formed by reacting sulphamic acid with an organic compound consisting of carbon, hydrogen and oxygen atoms and containing at least one functional group selected from the class consisting of alcohols, ethers and carboxylic acid esters, said organic compound having at least one functional alcoholic-OH group remaining in the molecule, there being present in the said organic compound no oxygen other than in the form of ethereal oxygen, carboxylic acid ester oxygen or alcoholic oxygen, which comprises admixing said sulphated product with a buffer agent selected from the class consisting of citric acid and water-soluble salts thereof.

6. A method for stabilizing a sulphated product formed by reacting sulphamic acid with an organic compound consisting of carbon, hydrogen and oxygen atoms and containing at least one functional group selected from the class consisting of alcohols, ethers and carboxylic acid esters, said organic compound having at least one functional alcoholic-OH group remaining in the molecule, there being present in the said organic compound no oxygen other than in the form of ethereal oxygen, carboxylic acid ester oxygen or alcoholic oxygen, which comprises admixing said sulphated product with a buffer agent selected from the class consisting of tartaric acid and water-soluble salts thereof.

7. A method for stabilizing a sulphated product formed by reacting sulphamic acid with an organic compound consisting of carbon, hydrogen and oxygen atoms and containing at least one functional group selected from the class consisting of alcohols, ethers and carboxylic acid esters, said organic compound having at least one functional alcoholic-OH group remaining in the molecule, there being present in the said organic compound no oxygen other than in the form of ethereal oxygen, carboxylic acid ester oxygen or alcoholic oxygen, which comprises admixing said sulphated product with a buffer agent selected from the class consisting of the phosphoric acids and water-soluble salts thereof.

8. An ammonium salt of a sulphate ester obtained by reacting sulphamic acid with an organic compound consisting of carbon, hydrogen and oxygen atoms and containing at least one functional group selected from the class consisting of alcohols, ethers and carboxylic acid esters, said organic compound having at least one functional alcoholic-OH group remaining in the molecule, there being present in said organic compound no oxygen other than in the form of ethereal oxygen, carboxylic acid ester oxygen or alcoholic oxygen, said ammonium salt being stabilized against premature decomposition due to a residual content of sulphamic acid by admixture therewith of a relatively small proportion of a buffer agent, said buffer agent being selected from the class consisting of weak inorganic and organic acids and water-soluble salts thereof selected from the group consisting of alkali metal, ammonium and amine salts.

9. An ammonium salt of a sulphate ester obtained by reacting sulphamic acid with an organic compound consisting of carbon, hydrogen and oxygen atoms and containing at least one functional group selected from the class consisting of alcohols, ethers and carboxylic acid esters, said organic compound having at least one functional alcoholic-OH group remaining in the molecule, there being present in said organic compound no oxygen other than in the form of ethereal oxygen, carboxylic acid ester oxygen or alcoholic oxygen, said ammonium salt being stabilized against premature decomposition due to a residual content of sulphamic acid by admixture therewith of a relatively small proportion of a buffer agent, said buffer agent being selected from the class consisting of weak inorganic acids and water-soluble salts thereof selected from the group consisting of alkali metal, ammonium and amine salts.

10. An ammonium salt of a sulphate ester obtained by reacting sulphamic acid with an organic compound consisting of carbon, hydrogen and oxygen atoms and containing at least one functional group selected from the class consisting of alcohols, ethers and carboxylic acid esters, said organic compound having at least one functional alcoholic-OH group remaining in the molecule, there being present in said organic compound no oxygen other than in the form of ethereal oxygen, carboxylic acid ester oxygen or alcoholic oxygen, said ammonium salt being stabilized against premature decomposition due to a residual content of sulphamic acid by admixture therewith of a relatively small proportion of a buffer agent, said buffer agent being selected from the class consisting of weak organic acids and water-soluble salts thereof selected from the group consisting of alkali metal, ammonium and amine salts.

11. An ammonium salt of a sulphate ester obtained by reacting sulphamic acid with an organic compound consisting of carbon, hydrogen and oxygen atoms and containing at least one functional group selected from the class consisting of alcohols, ethers and carboxylic acid esters, said organic compound having at least one functional alcoholic-OH group remaining in the molecule, there being present in said organic compound no oxygen other than in the form of ethereal oxygen, carboxylic acid ester oxygen or alcoholic oxygen, said ammonium salt being stabilized against premature decomposition due to a residual content of sulphamic acid by admixture therewith of a relatively small proportion of a buffer agent, said buffer agent being selected from the class consisting of organic polycarboxylic acids having at least 3 carbon atoms and water-soluble salts of such acids.

12. An ammonium salt of a sulphate ester obtained by reacting sulphamic acid with an organic compound consisting of carbon, hydrogen and oxygen atoms and containing at least one functional group selected from the class consisting of alcohols, ethers and carboxylic acid esters, said organic compound having at least one functional alcoholic-OH group remaining in the molecule, there being present in said organic compound no oxygen other than in the form of ethereal oxygen, carboxylic acid ester oxygen or alcoholic oxygen, said ammonium salt being stabilized against premature decomposition due to a residual content of sulphamic acid by admixture therewith of a relatively small proportion of a buffer agent, said buffer agent being selected from the class consisting of citric acid and water-soluble salts thereof.

13. An ammonium salt of a sulphate ester obtained by reacting sulphamic acid with an organic compound consisting of carbon, hydrogen and oxygen atoms and containing at least one functional group selected from the class consisting of alcohols, ethers and carboxylic acid esters, said organic compound having at least one functional alcoholic-OH group remaining in the molecule, there being present in said organic compound no oxygen other than in the form of ethereal oxygen, carboxylic acid ester oxygen or alcoholic oxygen, said ammonium salt being stabilized against premature decomposition due to a residual content of sulphamic acid by admixture therewith of a relatively small proportion of a buffer agent, said buffer agent being selected from the class consisting of tartaric acid and water-soluble salts thereof.

14. An ammonium salt of a sulphate ester obtained by reacting sulphamic acid with an organic compound consisting of carbon, hydrogen and oxygen atoms and containing at least one functional group selected from the class consisting of alcohols, ethers and carboxylic acid esters, said organic compound having at least one functional alcoholic-OH group remaining in the molecule, there being present in said organic compound no oxygen other than in the form of ethereal oxygen, carboxylic acid ester oxygen or alcoholic oxygen, said ammonium salt being stabilized against premature decomposition due to a residual content of sulphamic acid by admixture therewith of a relatively small proportion of a buffer agent, said buffer agent being selected from the class consisting of the phosphoric acids and water-soluble salts thereof.

JOHN RANDOLPH CLARK.
JOHN DAVID MALKEMUS.

REFERENCES CITED

The following references are of record in the file of this patent:

UNITED STATES PATENTS

| Number | Name | Date |
|---|---|---|
| 2,118,566 | Miles | May 24, 1938 |
| 2,157,320 | Buc | May 9, 1939 |
| 2,326,270 | Werntz | Aug. 10, 1943 |

FOREIGN PATENTS

| Number | Country | Date |
|---|---|---|
| 382,942 | Great Britain | 1932 |